Feb. 18, 1969    H. W. ZUCH    3,428,741
ANCHORED AND ENCLOSED BUS DUCT STRUCTURE
Filed March 14, 1967
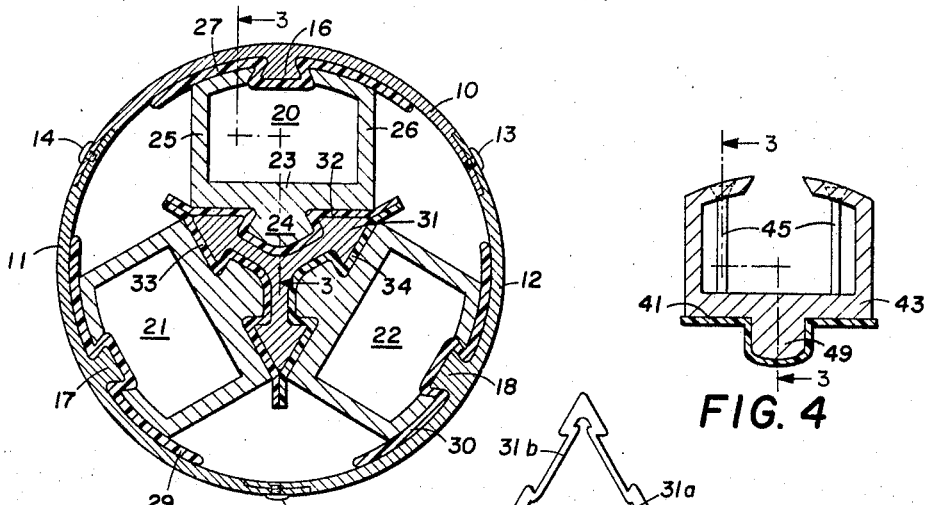
FIG. 1
FIG. 1a
FIG. 4
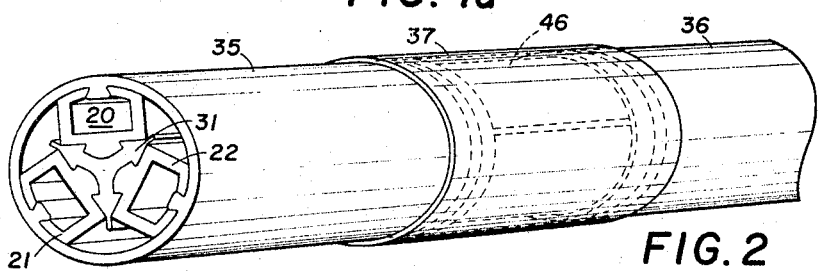
FIG. 2
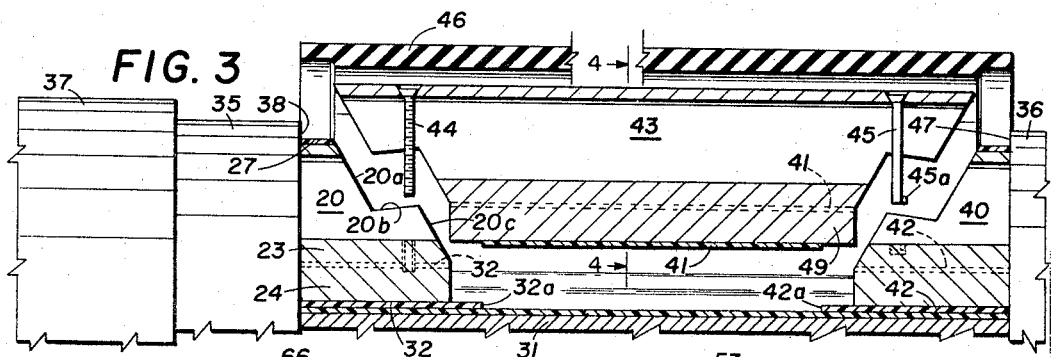
FIG. 3
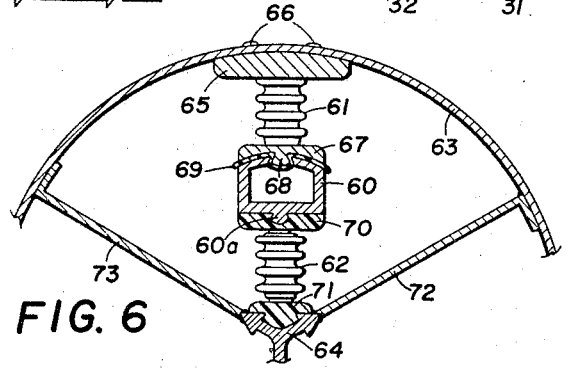
FIG. 6
FIG. 5
INVENTOR:
HELMUTH W. ZUCH
ATTORNEYS

3,428,741
ANCHORED AND ENCLOSED BUS DUCT STRUCTURE

Helmuth W. Zuch, P.O. Box 122,
Austin, Tex. 78767
Filed Mar. 14, 1967, Ser. No. 623,062
U.S. Cl. 174—99
Int. Cl. H02g 5/06; H01b 7/02

9 Claims

ABSTRACT OF THE DISCLOSURE

A unitary, pre-assembled, pre-insulated bus assembly for three-phase, three- or four-wire power transmission in which contoured conductor channels are locked to, but insulated from, each other by structure including a central member with means for accommodating anchorage to a cylindrical tubular housing.

---

This invention relates to electrical bus structures and more particularly to bus structures in which the electrical conductors are anchored but insulated from an enclosing metal housing.

Enclosed three-phase alternating current bus structures in general are known. For example, in prior U.S. Patent No. 2,973,405 to Zuch et al., one such system is disclosed and claimed. The present invention relates to an improvement over the structure shown in the latter patent.

A more recent patent representative of the state of the art is U.S. Patent No. 3,170,030 to Beck et al.

The present invention is directed to a system in which space utilization is optimized while maintaining structural characteristics which will assure that the integrity of the system will be maintained during stresses which may be encountered in operation. A cylindrical hollow housing is formed having inwardly facing surfaces symmetrical with respect to the axis of the housing. Three-phase conductors are symmetrically disposed inside the housing and extend longitudinally of the housing with 120° separation therebetween. A triangular-shaped conductive supporting member has equal sides which face the confronting sides of the conductors. Each side includes a tongue and groove interlock for interlock between the conductors and the support member. Means are provided for also establishing a tongue and groove interlock between the face of the conductor opposite the support member and the inner surface of the housing.

For a more complete understanding of the present invention and for further objects and advantages thereof, reference may now be had to the following description taken in conjunction with the accompanying drawings in which:

FIGURE 1 is a cross-sectional view of an embodiment of the invention;

FIGURE 1a is a modified form of center anchor strip;

FIGURE 2 illustrates the invention in a tubular form with the suitable joint therefor;

FIGURE 3 is an exploded view of a portion of the joint of FIGURE 2;

FIGURE 4 is a sectional view taken along lines 4—4 of FIGURE 3;

FIGURE 5 illustrates an alternative form of interlock structure at the inner surface of the housing; and FIGURE 6 illustrates a further embodiment of the invention.

FIGURE 1 illustrates a sectional view of a three-phase electrical conduit. The conduit is formed, in the embodiment shown in FIGURE 1, of three arcuate sections 10, 11, and 12, which are secured together by screws 13, 14, and 15 to form a continuous cylinder. The section 10 has a dovetailed rib 16 extending longitudinally thereof at a midpoint. The rib 16 faces the interior of the cylinder. Similarly, section 11 has a rib 17 and section 12 has a rib 18.

An array of conductors is inserted into the conduit formed by sections 10, 11, and 12 for the transmission of three-phase power. The conductor system is supported such that each conductor is insulated from every other conductor and further such that the conductors are insulated from the walls of the cylinder and are rigidly supported by a central structure which preferably will be a conductor. The structure will withstand stresses that might be applied thereto, either by electrical or mechanical action.

The conductor array is comprised of three identical channel conductors 20, 21, and 22. Conductor 20 is provided with a base 23 having a dovetailed rib 24 extending therealong. Two side walls 25 and 26 extend upwardly from the base 23 and inwardly with a space therebetween. Effectively the conductor 20 is an elongated substantially rectangular tube slotted on one arcuate side as to accommodate the dovetailed rib 16 and ribbed on the opposite side by rib 24 for interlocking at the base thereof with center structure. A sheet of insulating material 27 is interposed between the inner wall of the section 10 and the confronting ends of the sides 25 and 26 of conductor 20. By this means, the conductor 20 is rigidly locked to the section 10 but is insulated therefrom by the sheet 27. In a similar manner, the conductors 21 and 22 are locked to ribs 17 and 18 by insulating strips 29 and 30.

The bases of conductors 20–22 are interlocked by means of a Y-shaped center strip 31. The strip 31 is generally of the shape of an equilateral triangle having dovetailed ways at midpoints on each of the three sides. The dovetailed ways serve to receive the dovetailed ribs on the bases of conductors 20, 21, and 22. Insulating strips 32, 33, and 34 serve to insulate the conductors 20–22 from the center strip 31. By this means, the set of three conductors 20–22 is rigidly interlocked both with the exterior wall of the conduit and with the central strip 31. Alternatively, the strip may be hollow as shown in FIGURE 1a, where strip 31a has shallow ways 31b which may in some cases be more convenient in forming joints and facilitates cooling for high current uses.

The central rib 31 is of material such that it serves as a central support and, if conductive, serves to carry ground current. In such embodiment, it might be formed from either a conductor or a nonconductor, depending upon operating requirements, providing that it exhibits the requisite mechanical strength. On the other hand, the central rib 31 may be made of a conducting material and serve as the neutral conductor for the electrical system. It will be understood that the center member 31 may be of metal, though the quality of the metal may be such that it would not be suitable for electrical conductivity but would permit it to serve as the center support. Non-metallic, non-magnetic members may be employed in such case.

In a preferred embodiment, the conductors 20–22 would be made of extruded aluminum or of copper or any of the generally known materials employed for transmission of electrical power. Similarly, it would be preferred to extrude the center support from the same materials.

In forming the system, the conductors 20–22 would be extruded in lengths of 10 feet, 25 feet, or longer. The cylinder sections 10–12 are formed in sectors of lengths slightly less than the lengths of the conductors. With such construction, the conductors 20–22 would extend from both ends of the cylinder formed by sections 10–12. Such extensions may then be coupled as will hereafter be described to like sections of additional cylinders to form a continuous conducting system.

It has been found desirable to provide the rigidly and interlocking structure shown in FIGURE 1 in order for the system to oppose the forces that may be applied thereon when an electrical fault is placed on the system. The high current flow which is sometimes present under fault conditions applies torque to the conductors which, in an unanchored system, may exceed the mechanical limits of the conductive array and destroy the system. Thus, the interlocking arrangement shown herein has been found to be highly desirable for avoiding such problems and for maintaining the system integrity. The system employs a high form factor in that the volume available for electrical transmission is efficiently utilized. In the case of a four wire system, the interlocked conductors provide for reduction in the effective geometrical mean distance between conductors. This has increased significance particularly in connection with transmission of high frequencies by eliminating the harmonic influence. The conductors 20–22 have the slotted arcuate side which avoids eddy currents. The slotted side is employed as the anchoring arrangement. Thus, the slotted conductors involve a double function. They provide for rigidly anchoring the system and prevent the flow of undesired currents.

In FIGURE 2, the cylinder 35, formed by three of the arcuate sections shown in FIGURE 1, is illustrated as coupled to a like cylinder 36 by a coupling 37. The conductors 20–22 are shown supported in cylinder 35 by the dovetailed joints with the central member 31 and by dovetailed joints between the slotted arcuate outer surfaces of the conductors 20–22 and ribs on the inner surface of the cylinder 35. The insulation between the conductors 20–22, the central member 31, and the cylinder 35 has not been detailed, but it will be understood that such insulation will be provided substantially in accordance with the structure shown in FIGURE 1.

The joint 37 may be formed by employing structure shown in FIGURES 3 and 4. The conductor 20 extends beyond the end 38 of the cylinder 35. The end of the conductor 20 is cut along planes 20a, 20b, and 20c with the planes 20a and 20c having a negative slope and the plane 20b having a positive slope. The strip 32 of insulation which is under conductor 20 extends to a point 32a beyond the end of conductor 20. A short center segment (not shown) having cross-sectional shaped corresponding with the central section 31 of FIGURE 1 is then inserted into engagement with the ends of each of the three conductors, only conductor 20 being shown in FIGURE 3. The conductor 40 of the section 36 is shaped at the end thereof the same as conductor 20 and extends beyond the end of the cylinder 36.

A short strip of sheet insulator 41 is placed between the end 32a of the insulator section 32 and the end 42a of the insulator section 42.

A coupling conductor 43, of cross section shown in FIGURE 4 and having ends shaped to correspond with the ends of the conductors 20 and 40, is then placed in contact with the conductors 20 and 40 with the ends mating. Screws 44 and 45 are then served into threaded holes (not shown) in the bases of the conductors 20 and 40, respectively. Screw 44 is shown in conventional form. Screw 45 is shown in the form of a cam lock type, having cam 45a which will engage a suitable locking recess in conductor 40. Coupling members like member 43 are also employed to extend conductors 21 and 22. An insulating member 46 is then placed around the joint between the ends 38 and 47 of the cylinders 35 and 36, respectively, to encompass the three conductors joined in the manner illustrated for conductors 20 and 40. Thereafter, the cylinder 37 is telescoped over the joint area. The ends of the cylinder may be suitably waterproofed as by suitable mastic, resin, or gaskets, thereby to complete the joint.

As shown in FIGURE 4, the conductor 43 has sides and arcuate top portions thereof shaped the same as conductor 20. However, the base is provided with a rib 49 which has parallel sides rather than being of dovetailed construction. The relationship between the rib 49 and the insulation sheet 41 is also shown in FIGURE 4.

In FIGURE 5, an alternate method of anchorage between the conductors and the inner surfaces of the arcuate cylindrical sections is shown. In this embodiment, the slotted conductor 50 is coupled to the inner surface of a conduit 51 by means of an insulation member 52. The insulator 52 is an arcuate member which is secured to the inner wall of the conduit 51 by way of screws 53. The insulation may be secured by adhesive or may be installed by injection molding operations. The insulator 52 is provided with a dovetailed rib 54 which mates with the slot in the arcuate surface of the conductor 50. This construction may be preferred where it is more convenient to extrude a ribbed insulator than to produce a ribbed metal cylindrical member or where standard commercial tubing or conduits are to be used. Where desired, the conductor assembly may be employed in a nonconductive plastic tube. The base of the tube 50 interlocks with a central member, such as member 31, the same as shown in FIGURE 1.

FIGURE 6 illustrates a further embodiment of the invention where higher voltages are to be accomplished. In this embodiment, the conductor 60 has the same shape as conductor 20. However, it is supported by means of insulators 61 and 62 from the wall of a conduit 63 and from the center support member 64, respectively. Insulator 61 is secured to a mounting adapter 65 which is secured in conduit 63 as by screws 66, and by a mounting adapter 67 to the conductor 60. In a similar manner, an interlocking adapter 70 is coupled to the insulator 62 and is interlocked with the rib 60a on the conductor 60. The mounting adapters may be continuous or discontinuous. The insulator 60 is supported by and interlocked with the central member 64 by means of an adapter 71. Insulators are located at points along the conductor depending upon design requirements which take into consideration voltages, stress to be anticipated, and the like. The central member 64 is supported relative to the walls of the conduit 63 by radial strips 72 and 73. This is particularly applicable for operations requiring isolated, segregated, or non-segregated phase ducts. Elements 64, 72, and 73 preferably are non-magnetic conductors.

It will be seen from the foregoing description that a power conduit system has been provided in which a positive interlock is provided between the inner walls of a cylindrical housing and a central supporting member. The interlock is provided by the slotted and ribbed conductive tubes. While a dovetailed joint as been illustrated as preferred, other shapes may be employed without departing from the scope of the invention. However, with the structure shown, the conductors 20, 21, and 22 may initially be secured to a central support member 31 to form a subassembly. The latter subassembly may then be telescoped into the tube forming the cylindrical housing. Sections thus assembled will then be interconnected as in the manner shown in FIGURES 2–4.

Having described the invention in connection with certain specific embodiments thereof, it is to be understood that further modifications may now suggest themselves to those skilled in the art and it is intended to cover such modifications as fall within the scope of the appended claims.

What is claimed is:

1. In an electrical bus structure having a hollow housing with three circumferentially spaced inwardly facing surfaces having symmetry with respect to the axis of the structure, the combination which comprises:
    (a) three conductors symmetrically disposed inside the housing and extending longitudinally of the housing with 120° separation therebetween, (b) a triangular-shaped supporting member having equal sides facing confronting sides of said conductors, one of said supporting member and said conductors having dovetailed grooves therein and the other of said supporting member and said conductors having dovetailed ribs extending the length thereof and forming a structural interlock between said supporting member and said conductors, and (c) an insulating member interposed between the surfaces of said supporting member and said conductors for maintaining separation and electrical insulation between said conductors and said supporting member in interlocked relation.

2. The combination set forth in claim 1 in which said conductors each support longitudinally extending insulating strips to maintain separation between said surfaces and said conductors.

3. The combination set forth in claim 2 in which said conductors are longitudinally slotted to mate with said three inwardly facing surfaces.

4. The combination set forth in claim 3 in which said inwardly facing surfaces are ribbed with the ribs extending into the slots in the conductors in opposing relation to said conductors.

5. An electrical bus structure for insertion into a hollow housing which comprises:
(a) three conductors symmetrically disposed and extending parallel one to the other with 120° separation therebetween,
(b) a triangular-shaped supporting member having equal sides facing confronting sides of said conductors, one of said supporting member and said conductors having dovetailed grooves therein and the other of said supporting member and said conductors having dovetailed ribs extending the length thereof and forming a structural interlock between said supporting member and said conductors, and
(c) an insulating member interposed between the surfaces of said supporting member and said conductors for maintaining separation and insulation between said conductors and said supporting member in interlocked relation.

6. The combination set forth in claim 5 wherein each of said conductors comprises an elongated channel having side flanges interconnected by a central web and wherein a rib extends along the outer surface of said web for mating with said dovetailed grooves.

7. The combination set forth in claim 5 wherein said conductors each comprise open channels having a web coupled by said ribs to said grooves and having flanges which extend upward from said web and then extend laterally toward one another to provide opposing edges for confronting relation.

8. The combination set forth in claim 7 in which a cylindrical housing is provided for said structure having longitudinal ribs extending equilaterally along the inner surface of housing and occupying an elongated slot conformed by said confronting faces.

9. The combination set forth in claim 5 wherein said supporting member is an electrical conductor.

References Cited

UNITED STATES PATENTS

| 2,469,073 | 5/1949 | McArthur et al. | 174—99 |
| 2,815,396 | 12/1959 | Bartlett | 174—99 |
| 2,969,421 | 1/1961 | Scott | 174—117 |
| 2,973,405 | 2/1961 | Zuch et al. | 174—99 |

FOREIGN PATENTS 387,721  5/1965  Switzerland.

LARAMIE E. ASKIN, *Primary Examiner.*

U.S. Cl. X.R.

174—16, 88, 129